United States Patent [19]

Ward, deceased et al.

[11] 4,189,046
[45] Feb. 19, 1980

[54] CONVEYOR BELT CLEANING APPARATUS

[76] Inventors: Charles W. Ward, deceased, late of Doncaster, England; by Hilda Ward, administratrix, 35 Central Blvd., Wheatley Hills, Doncaster, England

[21] Appl. No.: 841,980

[22] Filed: Oct. 13, 1977

[51] Int. Cl.² ............................................. B65G 45/00
[52] U.S. Cl. ................................. 198/499; 15/256.5
[58] Field of Search .......................... 198/497–499, 198/502, 856; 74/230; 15/256.5, 0.51, 256.6

[56] References Cited

U.S. PATENT DOCUMENTS

| 3,631,968 | 1/1972 | Ward ................................ | 198/499 |
| 3,848,734 | 11/1974 | Heiland .............................. | 198/498 |
| 3,963,115 | 6/1976 | Teske et al. ...................... | 198/502 |
| 4,088,219 | 5/1978 | Binns ................................ | 198/856 |

FOREIGN PATENT DOCUMENTS

| 703082 | 1/1954 | United Kingdom .................. | 198/856 |
| 1420439 | 1/1976 | United Kingdom .................. | 198/499 |

*Primary Examiner*—Joseph E. Valenza
*Attorney, Agent, or Firm*—Browdy and Neimark

[57] ABSTRACT

A conveyor belt cleaning apparatus includes a scraper member mounted for movement into engagement with a run of the conveyor belt, and includes at least one fluid pressure actuated ram or torque motor for holding the scraper member against the belt when the conveyor is in operation.

6 Claims, 6 Drawing Figures

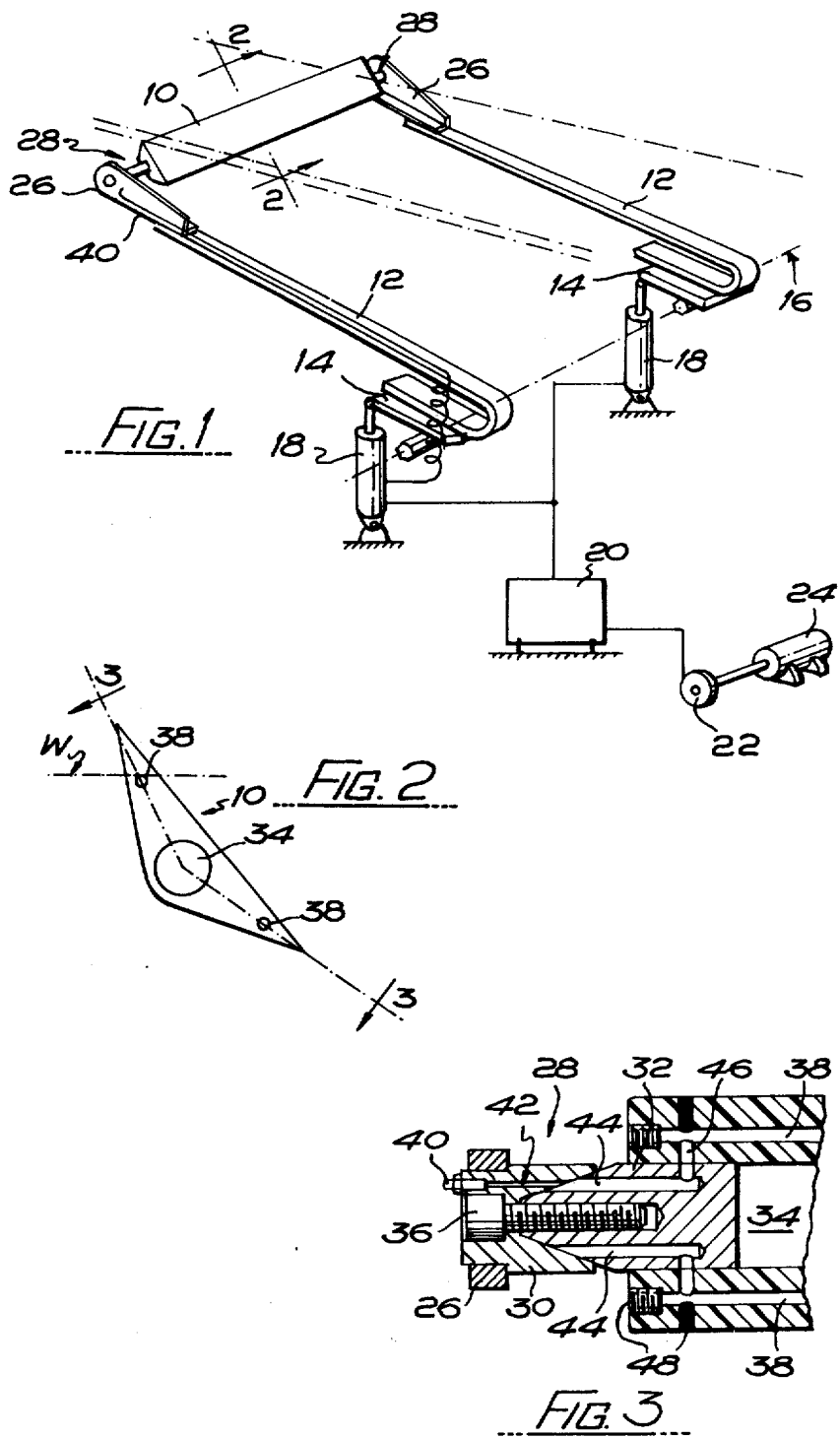

CONVEYOR BELT CLEANING APPARATUS

FIELD OF THE INVENTION

The present invention relates to conveyor belt cleaning apparatus and has for its object to provide an improvement therein.

BACKGROUND OF THE INVENTION

In conveyor belt systems such as are used, for example, for the transportation of coal and mineral ores and other materials, belt cleaning apparatus is commonly provided having a scraper member bearing against the underside of the belt so that dirt is scraped off as the belt moves relative to the scraper member. The scraper member is commonly urged into engagement with the belt by resilient means, but as the scraper member wears away and as stretch of the belt takes place it becomes necessary for adjustment to be made from time to time so as to maintain adequate pressure between the scraper member and belt. This inevitably involves a certain amount of trouble and inconvenience. The present invention aims to at least alleviate this.

SUMMARY OF THE INVENTION

According to one aspect of the present invention, there is provided conveyor belt cleaning apparatus including at least one scraper member secured at its opposite ends to respective carrier members, the or each scraper member being acted upon by at least one hydraulic or pneumatic ram or at least one torque motor to maintain the scraper member in engagement with a run of a conveyor belt against which it is arranged to bear with a required pressure, the or each hydraulic or pneumatic ram or torque motor being connected in a hydraulic or pneumatic circuit which also includes means arranged to maintain a hydraulic or pneumatic pressure in the system whenever the conveyor is in operation. A pressure switch will preferably be provided to operate an audible or visible alarm in the event of a loss of hydraulic or pneumatic pressure. The hydraulic or pneumatic pump may be driven either by an electric motor or by a roller in contact with the conveyor belt. The carrier members will preferably (but not necessarily) be constituted by respective leaf springs.

According to another aspect of the present invention, there is provided conveyor belt cleaning apparatus including at least one scraper member secured at its opposite ends to respective carrier members, the or each scraper member being acted upon by at least one pneumatic ram or by at least one torque motor forming part of a control system for maintaining the scraper member in engagement with a run of a conveyor belt against which it is arranged to bear, the or each pneumatic ram or torque motor being connected in a pneumatic circuit which also includes means arranged to maintain a pressure in the system whenever the conveyor is in operation, the air under pressure in the control system being able to communicate with a cavity within the scraper member so that when a scraper edge of the latter becomes worn down to such an extent that the scraper member needs to be replaced or needs to be adjusted to bring a new scraper edge into use, the cavity within the scraper member becomes ruptured whereby air under pressure can escape from a part of the system to allow the scraper member to move away from the conveyor belt, or to actuate an audible or visible alarm, or both. If the or each scraper member is provided with two or more scraper edges which can be brought into use selectively or in turn as wear takes place, it will be provided with respective cavities which will be spaced appropriate distances from the respective edges, the appropriate cavity preferably being placed in communication with the air under pressure in the control system as the scraper member is being fitted or being adjusted to bring a selected scraper edge into use. The or each scraper member may be provided with a pair of cavities spaced different distances from the or each scraper edge, the arrangement being such that as a scraper edge wears away a first cavity becomes ruptured to give an initial warning that the scraper member needs to be adjusted or replaced and after further wear a second cavity becomes ruptured to give a more strident warning or to allow the scraper member to move away from the conveyor belt, or both. The arrangement will preferably be such that the pneumatic ram or rams or torque motor or motors will maintain the scraper member against the conveyor belt with a required pressure despite wear of the scraper member and stretch of the belt. At least two scraper assemblies will preferably be mounted one in advance of the other between their respective carrier members, the latter being mounted at their ends remote from their respective scraper members on respective carriers pivotally mounted for angular adjustment about a common axis, means being provided for acting against the pairs of carriers selectively so that the respective scraper assemblies are loaded selectively against the conveyor belt which they are to clean when the at least one hydraulic or pneumatic ram or torque motor, as the case may be, operates to maintain the scraper assemblies in engagement with the belt. In this case, the pairs of carriers on which the respective pairs of carrier members are mounted may be freely rotatable on a shaft or on co-axial shafts and the means provided for acting against the pairs of carriers to load the respective scraper assemblies against the conveyor belt which they are to clean may be constituted by respective screw means carried by a pair of brackets or by respective pairs of brackets fixed on the shaft, or the co-axial shafts as the case may be, on which the pairs of carriers are freely rotatable. The apparatus will preferably include respective fixing brackets which can be secured in alignment to frame structure of the conveyor on opposite sides of the belt, mounting means for respective pneumatic rams, and means whereby the fixing brackets and said mounting means for the respective pneumatic rams can be interengaged in any one of a plurality of different angular positions.

BRIEF DESCRIPTION OF THE DRAWINGS

In order that the present invention may be fully understood and readily carried into effect, the same will now be described, by way of example only, with reference to the accompanying drawings, of which:

FIG. 1 is a perspective schematic view of apparatus embodying the invention,

FIG. 2 is a sectional view on the line 2—2 in FIG. 1,

FIG. 3 is a sectional view on the line 3—3 in FIG. 2,

FIG. 6 is a diagrammatic view of a pneumatic control circuit which will presently be referred to.

DETAILED DESCRIPTION OF PREFERRED EMBODIMENTS

Figure 4:
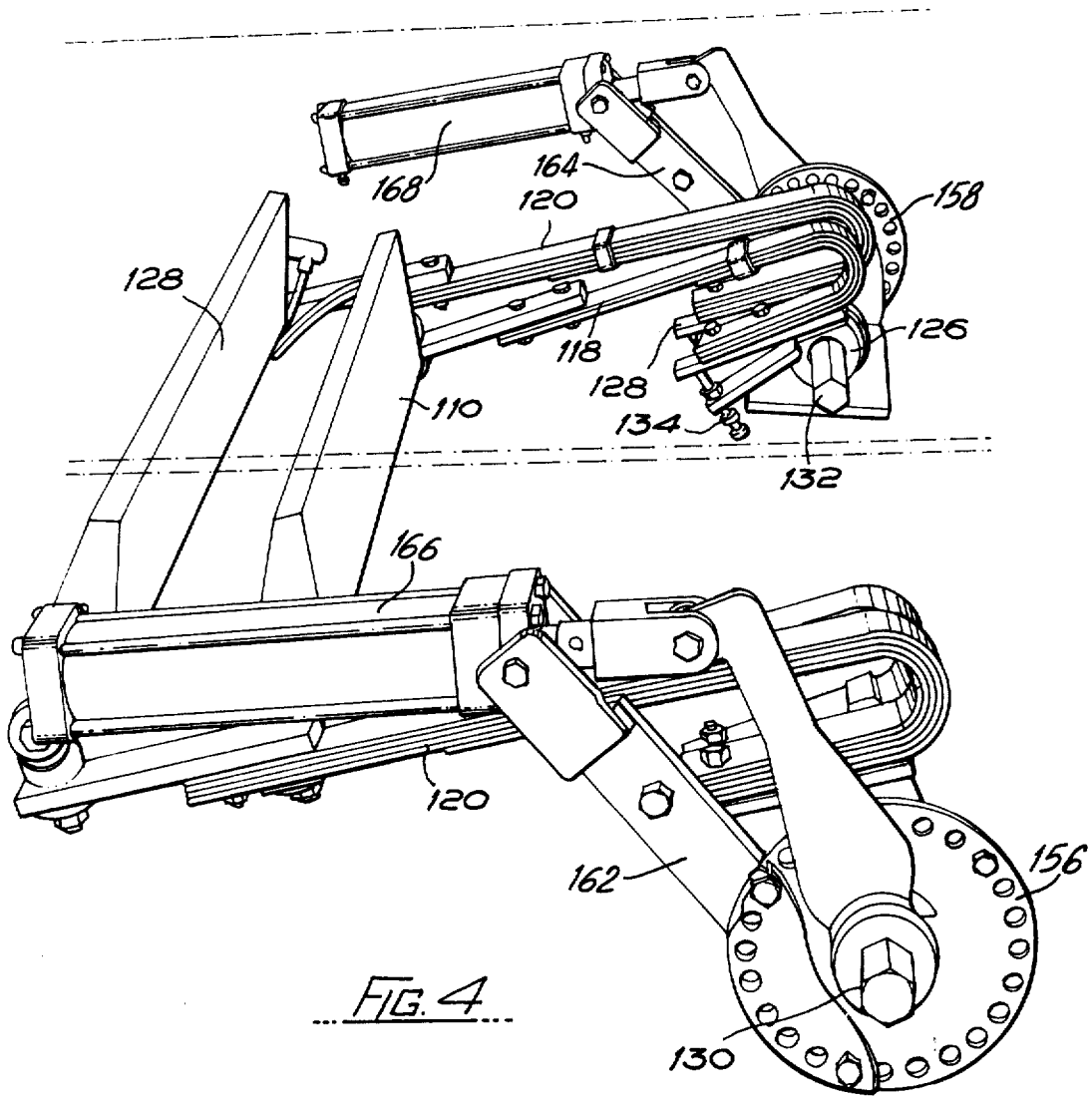
FIG. 4 is a perspective view of different apparatus embodying the invention.

Referring now to FIGS. 1 to 3 of the drawings, apparatus for cleaning a conveyor belt (shown in chain-dotted lines in FIG. 1) includes a scraper member generally indicated 10 secured at its opposite ends to carrier members constituted by respective leaf springs 12 so as to bear against the underside of the belt.

The leaf springs are mounted at their ends remote from the scraper member on respective carriers 14 which are freely mounted for pivotal movement about an axis 16. Respective pneumatic rams 18 are connected, as shown, to the free ends of the carriers 14 and are connected in a pneumatic circuit which also includes a pneumatic accumulator 20 and a pneumatic pump 22 driven by an electric motor 24. The arrangement is such that whenever the conveyor is in operation the electric motor drives the pump 22 and maintains a substantially constant pressure of air in the accumulator 20. The pressure within the accumulator acts equally in the two pneumatic rams so that when the conveyor is in operation the scraper member is maintained in engagement with the run of the belt against which it is arranged to bear with a required substantially constant pressure (despite wear of the scraper member and stretch of the belt). It will also be understood that the arrangement is such that leakage of air from the system allows the scraper member to fall away from the conveyor belt. Consequently, when the conveyor has been stationary for some time, the scraper member will have fallen away from the conveyor belt and the conveyor can be re-started more easily than if the scraper member had remained in engagement with the belt. After only a very short period of subsequent operation the air pressure within the system is re-established so that the scraper member moves back into contact with the belt. The fact that this occurs quite automatically and without the need for operator control is a very useful feature of the invention. It will also be understood that since the apparatus maintains the scraper member in contact with the belt with a substantially constant pressure despite wear of the scraper member and stretch of the belt, the apparatus will only require adjustment at very long intervals of time.

Referring now in particular to FIGS. 2 and 3, it will be seen that the scraper member is formed so that it provides two scraper edges which can be brought into use selectively by adjusting the scraper member in position at a required angle relative to respective carrier plates 26 which are bolted to the free ends of the leaf springs. The scraper member is secured at its opposite ends to the respective carrier plates by means including respective taper plug and socket fixings generally indicated 28. Taper socket portions 30 of said fixings project inwardly towards the scraper member from the respective carrier plates to which they are welded as shown in FIG. 3. Taper plug portions 32 of said fixings on the other hand project outwardly from a central hole 34 which extends through the scraper member and engage the taper socket portions. Screw means, constituted by respective bolts 36 (only one of which is shown in FIG. 3) one of which has a right hand thread and the other of which has a left hand thread, are provided for tightening the taper plug and socket fixings and securing the scraper member at a required angle.

It will also be seen from FIGS. 2 and 3 that the scraper member is provided with respective cavities 38 which extend longitudinally of the member and which are spaced appropriate distances from the respective scraper edges. When the edges have been worn away so that the cavities are broken into, as shown by the chain dotted line W in FIG. 2, it is time for the scraper member to be re-adjusted to bring the other edge into operation or for the replacement of the scraper member by a new one. Air under pressure in the control system is able to communicate with the cavity 38 adjacent that scraper edge which for the time being is in use by way of a flexible conduit 40 which is shown extending along one of the leaf springs and connected to one of the pneumatic rams 18 (but it will be understood that it could be connected into any part of the system). The arrangement is such that when the scraper edge which is in use becomes so badly worn down that the adjacent cavity 38 is broken into, the sudden massive loss of air from the control system through the exposed cavity cannot be compensated for by the relatively small delivery of air from the pump and thus the pneumatic rams are allowed to retract and the scraper member is consequently allowed to fall away from the conveyor belt. A pressure switch (not shown) is provided in the control system and is arranged to operate an audible and/or visible alarm in the event of a sudden loss of pneumatic pressure. An operative can then re-position or replace the worn scraper member as required.

As shown in FIG. 3, the flexible conduit 40 communicates with the cavity adjacent the scraper edge which is for the time being in use through a hole 42 which extends through the socket portion 30 of the adjacent fixing 28. The hole 42 is automatically caused to communicate with the correct one of two oppositely located feed ports 44 in the taper plug portion 32, to communicate with the correct one of the two cavities 38, as the scraper member is adjusted in position to bring the required scraper edge into use. The ends of cross drillings 46 and the ends of the cavities 38 are shown to have been plugged at 48.

Figure 5:
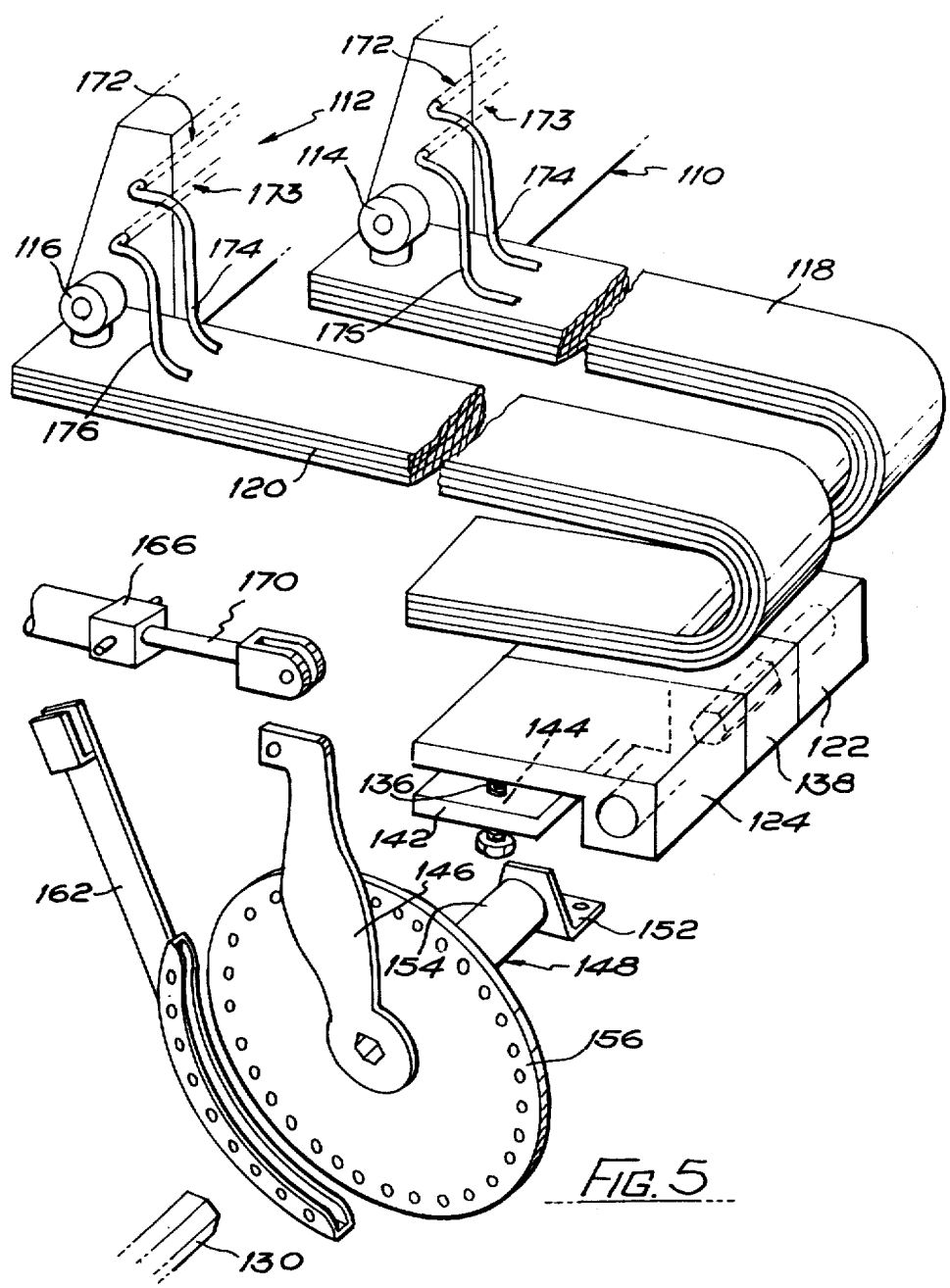
FIG. 5 is an exploded view of the component parts at one side of the apparatus.

Referring now to FIGS. 4 and 5, in a rather different apparatus embodying the invention, a pair of scraper assemblies 110 and 112 are mounted one in advance of the other between respective pairs of holders 114 and 116 carried by locating arms constituted by groups of leaf springs 118 and 120 so that said scraper assemblies bear against the underside of a conveyor belt (shown in chain-dotted lines) resiliently.

The leaf springs are mounted at their ends remote from the scraper members on respective carriers 122, 124 and 126, 128 which are freely rotatable on co-axial shafts 130 and 132, and screw means constituted by respective pairs of screws 134 and 136 are provided for acting against the pairs of carriers to load the scraper assemblies against the conveyor belt which they are to clean. The screw means referred to are carried by a single pair of brackets 138, each such bracket being located between the carriers against which its screw means act and having a hexagonal bore for receiving, non-rotatably, an inner end of the hexagonal section shaft on which it is mounted. Each bracket 138 has a pair of laterally extending plate elements 142 through which the screws 134 and 136 extend at the spacing of the carriers 122 and 124, said screws being located in adjusted positions by locknuts 144. The outer end of each hexagonal section shaft is provided with a lever 146 a boss portion of which is a sliding non-rotatable fit on the shaft.

Fixing brackets 148 are provided for mounting the cleaning apparatus on fixed frame structure (not shown) of a conveyor, said brackets including apertured plates 152 for bolting to said fixed frame structure and also including lengths of tube 154 on the outer ends of which respective circular plate members 156 and 158 are welded.

Respective mounting brackets 162 and 164 are bolted to the plate members 156 and 158 as shown and have forked outer ends in which the cylinders of respective double acting pneumatic rams 166 and 168 are trunnion mounted as shown. The piston rods 170 of the pneumatic rams are pivotally connected to the outer ends of the respective levers 146.

Respective pairs of cavities 172 and 173 extend longitudinally of the scraper members 110 and 112 as shown in FIG. 5 and respective conduits 174 and 176 are connected into said cavities at one side of the apparatus (the ends of the cavities at the other side of the apparatus having been plugged). The conduits communicate with a control system which is shown diagrammatically in FIG. 6.

Figure 6:
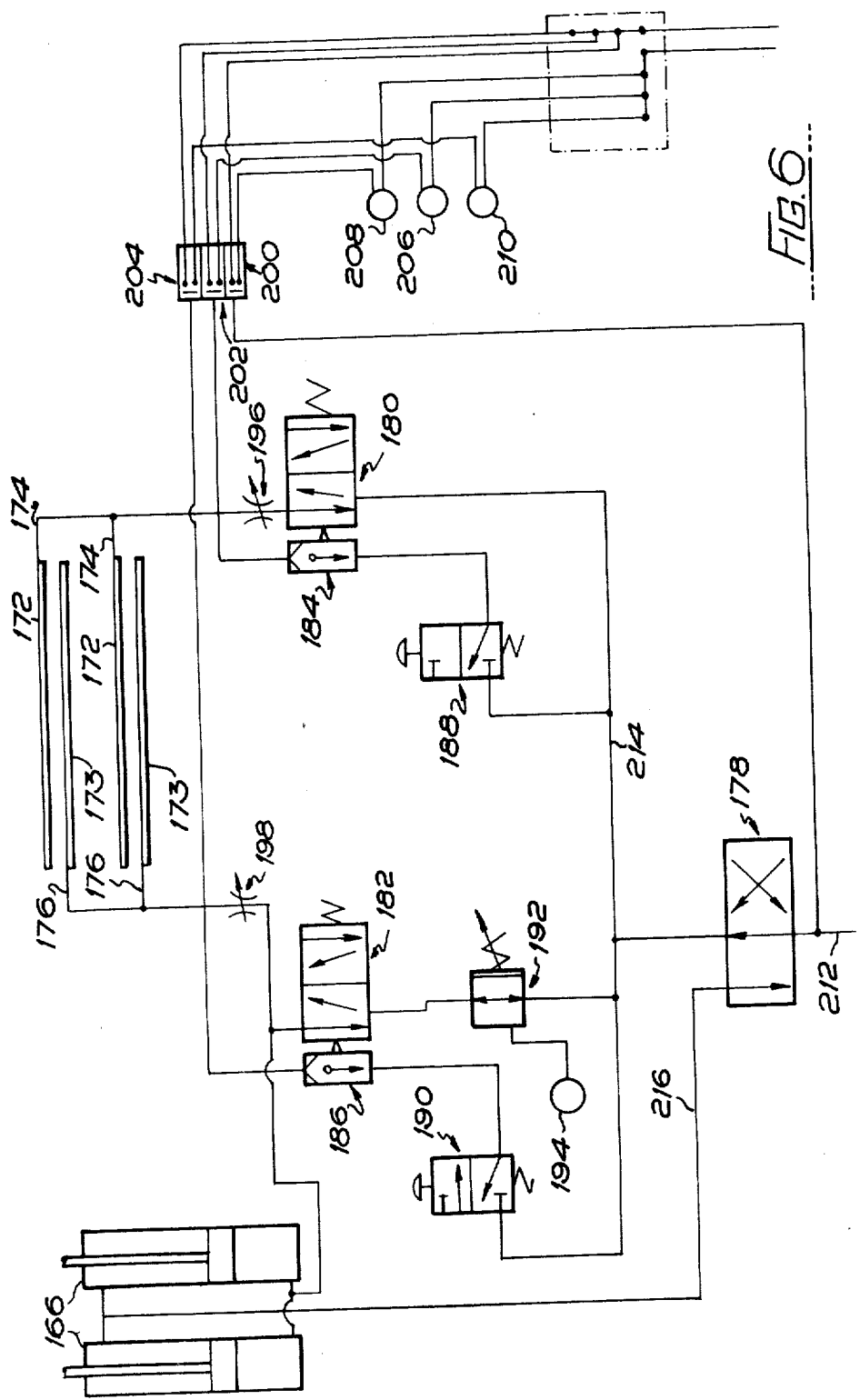

Referring now to FIG. 6, the control system includes a key operated control valve 178; a pair of spool valves 180 and 182 under the control of respective auxiliary valves 184 and 186; respective manually operable re-set valves 188 and 190 communicating with said auxiliary valves; a pressure regulator 192; a pressure gauge 194; respective flow control valves 196 and 198 in the conduits 174 and 176 which communicate with the cavities in the scraper members; and three pressure switches 200, 202 and 204 which are arranged to close electric circuits including respective electric light bulbs 206, 208 and 210 colored, green, amber and red.

The operation of the control system is as follows:

When the key operated control valve is opened, air under pressure can pass from a main supply line 212 into a feed line 214 which communicates with the spool valves 180 and 182 and with the re-set valves 188 and 190. The air pressure in the feed line is indicated by the pressure gauge 194 and can be adjusted by the regulator 192. (The presence of air under pressure in the main supply line 212 is indicated by the closure of the pressure switch 200 and the non-illumination of the green light bulb 206). The re-set valves 188 and 190 must then be opened momentarily by pressing the push buttons associated with them. This allows air under pressure to pass to the auxiliary valves 184 and 186 which causes their associated spool valves to open so that air under pressure can pass through said respective spool valves into the conduits which communicate with the cavities in the scraper member. Simultaneously, the pressure switches 202 and 204, which communicate as shown with the conduits 174 and 176 respectively, cause the electric lights 208 and 210 to be open circuited, and the pneumatic rams 166 which communicate with the conduits 176 are actuated so that they urge the scraper member into engagement with the conveyor belt.

After a period of prolonged use the scraper members will become worn down to such an extent that the cavity 172 in one or the other of them will be ruptured to allow the escape of air under pressure from a part of the control system, that is to say from the scraper side of the flow control valve 196. Air under pressure will thus be released from the auxiliary valve 184 and the spool valve 180 will be able to close under spring pressure. Consequently, the pressure switch 202 will be allowed to close and the amber light bulb 208 will be illuminated to indicate that the scraper members should be replaced or that they should very shortly be replaced. However, after a further period of use the cavity 173 in one or the other of the scraper members will be ruptured and this will allow the escape of air under pressure from another part of the control system, that is to say from the scraper side of the flow control valve 198. Air under pressure will thus be released from the auxiliary valve 186 and the spool valve 182 will be able to close under spring pressure. Simultaneously, the air under pressure in the pneumatic rams will be allowed to escape and the scraper members will fall away from the conveyor belt. An indication of this will be immediately given by the closure of the pressure switch 204 causing the red light bulb 210 to be illuminated.

Before a workman starts to replace the worn scraper members, he will close the key operated valve 178 so that air under pressure can communicate with a feed line 216 to positively retract the double acting rams and hold the scraper members away from the conveyor belt.

It will be understood that the loss of air under pressure from the control system will be minimal and of very short duration following the rupture of the cavities 172 and following the rupture of the cavities 173. It will also be understood that when the scraper members have moved away from the conveyor belt the apparatus will remain in this condition until the worn scraper members have been replaced and the re-set valves operated.

The condition of the apparatus can be ascertained by observing the light bulbs 206, 208 and 210 which of course can be located near the apparatus or at some remote location as required. It will also be understood that the electric circuits containing the light bulbs may contain or be associated with further warning means, for example audible alarms, and that a quite strident warning may be given when the apparatus is no longer operable due to excessive wear of the scraper members or failure of the air supply.

Various modifications may be made without departing from the scope of the invention. For example, the scraper members of the arrangement illustrated could if preferred be provided with two or three scraper edges capable of being brought into use selectively. Furthermore, each scraper member could be provided with only a single cavity which when ruptured caused a warning signal to be given or caused the scraper members to be moved away from the conveyor belt. The arrangement may be such that the condition of the scraper member or members can be indicated at some remote location (for example in an office building) so that the need for replacement of a worn scraper member can be ascertained with the minimum of trouble and inconvenience. In the case of a scraper member with a pair of cavities which will become ruptured in succession, an indication that a first one of the cavities has recently become ruptured may be taken to mean that the scraper member can continue in use for the time being but that arrangements must be made for its replacement within, say, one week of further use. It should also be understood that the scraper member or members need not necessarily be acted upon by hydraulic or pneumatic rams to maintain the scraper member in engagement with a run of a conveyor belt against which it is arranged to bear with a required pressure. A so-called torque motor could be provided to exert a predetermined torque on a shaft from which the carrier members project (or a pair of such torque motors could be provided to act on respective shafts) and in this case the or each torque motor could act against the shaft on which it is arranged to exert a torque by means of a pinion meshing with a gear segment.

The working medium of the control system could of course be hydraulic fluid instead of air under pressure but it would probably not be desirable to allow the leakage of hydraulic fluid, even though this might only be a very small quantity of fluid, from the system to indicate excessive wear of the scraper member. It might be thought desirable in such a situation to either omit the feature of the working fluid being contained under pressure in the scraper member or alternatively to incorporate a dual circuit arrangement, that is to say to have hydraulic fluid in a first circuit containing the rams or torque motor for raising the scraper member into engagement with the belt and to have air under pressure in a second circuit communicating with the cavity adjacent the scraper edge which is for the time being in use, the two circuits being interconnected, that is to say a sudden drop of pressure in the air circuit causing a sudden drop of pressure in the hydraulic circuit and stoppage of the hydraulic pump. A hydraulic or pneumatic pump for charging the control circuit (or each pump if a dual circuit arrangement is used) may be driven by a roller in contact with the conveyor belt instead of by an electric motor. The carrier members are preferably constituted by respective leaf springs so that the or each scraper member is held against the conveyor belt resiliently. However, this is not essential, especially if the working fluid in the control system is air under pressure, which is of course compressible.

What I claim and desire to secure by Letters Patent is:

1. A conveyor belt cleaning apparatus, comprising:
   at least one scraper member;
   respective carrier members to which opposite ends of the scraper member are secured;
   at least one fluid pressure actuated device for maintaining the scraper member with a scraper edge in engagement with a run of a conveyor belt against which it is arranged to bear with a required pressure;
   a fluid pressure circuit to which the at least one fluid pressure actuated device is connected;
   a fluid pump for maintaining a fluid pressure in the fluid pressure circuit whenever the conveyor is in operation;
   means for driving said fluid pump at least when the conveyor is in operation; and
   a cavity within the scraper member and spaced from the scraper edge, said cavity communicating with the fluid pressure circuit, the arrangement being such that when the scraper edge becomes worn down to such an extent that the scraper member needs to be replaced the cavity within the scraper member becomes ruptured whereby fluid under pressure is allowed to escape from the fluid pressure circuit so that the scraper member is allowed to move away from the conveyor belt.

2. Conveyor belt cleaning apparatus according to claim 1, in which said at least one scraper member is provided with at least two scraper edges which can be brought into use selectively as wear takes place, and is provided with respective cavities spaced appropriate distances from the respective edges, the appropriate cavity being placed in communication with the fluid under pressure in the control system as the scraper member is being adjusted to bring a selected scraper edge into use.

3. Conveyor belt cleaning apparatus according to claim 1, in which said at least one scraper member is provided with a pair of cavities spaced different distances from the at least one scraper edge, and further including means associated with said fluid pressure circuit for giving warning signals in response to a loss of fluid pressure from said pair of cavities, the arrangement being such that as the at least one scraper edge wears away a first cavity becomes ruptured to give an initial warning that said at least one scraper edge is becoming excessively worn and after further wear a second cavity becomes ruptured to give a more strident warning to indicate that the at least one scraper edge has become excessively worn.

4. Conveyor belt cleaning apparatus according to claim 1, including at least two scraper assemblies mounted one in advance of the other between their respective carrier members, the latter being mounted at their ends remote from their respective scraper members on respective carriers pivotally mounted for angular adjustment about a common axis, means being provided for acting against the pairs of carriers selectively so that the respective scraper assemblies are loaded selectively against the conveyor belt which they are to clean when the at least one fluid pressure actuated device operates to maintain the scraper assemblies in engagement with the belt.

5. Conveyor belt cleaning apparatus according to claim 4, in which the pairs of carriers on which the respective pairs of carrier members are mounted are freely rotatable on the shaft and in which the means for acting against the pairs of carriers to load the respective scraper assemblies against the conveyor belt which they are to clean are constituted by respective screw means.

6. Conveyor belt cleaning apparatus according to claim 1, including respective fixing brackets which can be secured in alignment to frame structure of the conveyor on opposite sides of the belt, mounting means for respective pneumatic rams, and means whereby the fixing brackets and said mounting means for the respective pneumatic rams can be interengaged in any one of a plurality of different angular positions.

* * * * *